United States Patent
Karube et al.

Patent Number: 6,034,979
Date of Patent: Mar. 7, 2000

[54] LASER OSCILLATOR

[75] Inventors: Norio Karube, Machida; Akio Ikesue, Oshino-mura; Yoichi Sato, Fujiyoshida, all of Japan

[73] Assignee: Fanuc, Ltd., Yamanashi, Japan

[21] Appl. No.: 09/066,411

[22] PCT Filed: Sep. 4, 1997

[86] PCT No.: PCT/JP97/03104

§ 371 Date: May 4, 1998

§ 102(e) Date: May 4, 1998

[87] PCT Pub. No.: WO98/10495

PCT Pub. Date: Mar. 12, 1998

[30] Foreign Application Priority Data

Mar. 4, 1996 [JP] Japan ................................. 8-252231

[51] Int. Cl.[7] .................................................. H01S 3/14
[52] U.S. Cl. ........................................... 372/39; 372/40
[58] Field of Search ........................... 372/53, 54, 39–42

[56] References Cited

U.S. PATENT DOCUMENTS

| | | |
|---|---|---|
| 3,631,361 | 12/1971 | Blumenthal . |
| 3,708,759 | 1/1973 | Collier et al. . |
| 4,742,524 | 5/1988 | Muller . |
| 5,359,615 | 10/1994 | Sasaki et al. ........................... 372/39 |
| 5,448,582 | 9/1995 | Lawandy ............................... 372/39 |
| 5,644,588 | 7/1997 | Misawa ................................. 372/54 |
| 5,717,517 | 2/1998 | Alfano et al. ......................... 372/39 |
| 5,805,623 | 9/1998 | Utano et al. .......................... 372/54 |

FOREIGN PATENT DOCUMENTS

| | | |
|---|---|---|
| 47-6079 | 4/1972 | Japan . |
| 51-59911 | 5/1976 | Japan . |
| 61-156790 | 7/1986 | Japan . |
| 3-116794 | 5/1991 | Japan . |
| 6-92721 | 4/1994 | Japan . |

OTHER PUBLICATIONS

Patent Abstracts of Japan, vol. 012, No. 211 (E–622), Jun. 16, 1988 for JP 63007689 (Hamamatsu Photonics KK), Jan. 13, 1988.

Patent Abstracts of Japan, vol. 017, No. 583 (E–1452), Oct. 22, 1993 for JP 05175591 (Kurosaki Refract Co. Ltd), Jul. 13, 1993.

Patent Abstracts of Japan, vol. 018, No. 093 (C–1166), Feb. 16, 1994 for JP 05294722 (Kurosaki Refract Co. Ltd), Nov. 9, 1993.

Patent Abstracts of Japan, vol. 018, No. 107 (C–1169), Feb. 22, 1994 for JP 05301769 (Kurosaki Refract Co. Ltd), Nov. 16, 1993.

*Primary Examiner*—Leon Scott, Jr.
*Attorney, Agent, or Firm*—Staas & Halsey LLP

[57] ABSTRACT

A laser oscillator which uses a granular laser gain medium to secure a large gain volume and is capable of suppressing resonator loss caused by granular-boundary scattering. A suspension (1), which is obtained by dispersing a number of dielectric grains doped with a luminous element in fluid having refractive index matched with that of the dielectric grains, is filled in a cell (6). The cell (6) filled with the suspension (1) is disposed in an optical resonator constituted by a rear mirror (3) and an output mirror (4). When the cell (6) is irradiated with excitation light (2), the dielectric grains in the suspension (1) are subjected to laser pumping and a laser beam (5) is output. Since the dielectric grains coexist with the refractive index-matched fluid, the granular-boundary scattering is suppressed, making it possible to provide a low-loss optical resonator. Dielectric grains with a slightly greater diameter may alternatively be distributed in filling liquid which is refractive index-matched fluid.

29 Claims, 7 Drawing Sheets rn IS LARGE rn IS SMALL (rn ~ 0)

LASER OSCILLATOR

TECHNICAL FIELD

The present invention relates to a laser oscillator using a granular solid material as a gain medium, and more particularly to a laser oscillator using a number of dielectric grains admixed with lanthanide series or the like, as the gain medium.

BACKGROUND ART

As a typical material used as a gain medium for a solid-state laser oscillator, there is known a dielectric bulk of, for example, $Y_3Al_5O_{12}$ doped with a luminous element such as lanthanide series. The form of such a bulk is in general single crystal or amorphous. This is because, if a bulk material of some other form (mass of polycrystalline or crystalline grains) is placed in an optical resonator, the resonator loss increases due to light scattering occurring inside the bulk, making it impossible to obtain a sufficient laser output.

In order to further increase the output of a solid-state laser, it is necessary to enlarge the gain medium of the laser oscillator in size to increase the gain length or to increase the percentage of a luminous element (dopant concentration) doped in the gain medium. However, using a large-sized single crystal is not advantageous in terms of cost, and present-day techniques of single crystal growth place restrictions on increasing the doping concentration of the luminous element.

If an amorphous material doped with a luminous element such as lanthanide series is used as the gain medium, then it is relatively easy to increase the size of the gain medium and to increase the doping concentration of the luminous element. Amorphous materials in general are, however, low in heat conductivity and difficulty arises in efficiently dissipating heat generated during high-output operation of the laser oscillator, possibly causing thermal breakdown of the materials. It is, therefore, difficult to use an amorphous material doped with a luminous element such as lanthanide series, as the gain medium for a high-output laser.

Thus, there is a difficulty in increasing the output of a laser oscillator by using, as its gain medium, a material doped with a luminous element such as lanthanide series and having the form of single crystal or amorphous bulk. To resolve the situation, attempts have been made to use as the gain medium of a laser oscillator a material doped with a luminous element such as lanthanide series and having the form of numerous dielectric grains.

These attempts are based on the idea that dielectric grains consisting of high-quality single crystals can be relatively easily produced at low cost, and since a large heat radiating surface area is ensured even if the dielectric grains are amorphous, the possibility of thermal breakdown lessens and increase in the output of a laser oscillator can be expected.

However, where dielectric grains are used as the gain medium, increased gain volume for higher output of a laser oscillator constitutes an additional cause of the resonator loss, impeding increase of the output of the laser oscillator. Specifically, in cases where dielectric grains are used as the gain medium, if the density of dielectric grains is increased to thereby increase the gain volume, then granular-boundary scattering of a laser beam occurring between the dielectric grains intensifies and thus the resonator loss increases, making it difficult to increase the laser oscillator output in practice.

DISCLOSURE OF INVENTION

An object of the present invention is to provide a low-cost, high-output, high-efficiency laser oscillator using, as a gain medium thereof, dielectric grains admixed with a variety of laser luminous elements.

According to the present invention, a large number of dielectric grains doped with a luminous element are distributed in a medium having refractive index matched with that of the dielectric grains, and the dielectric grains and the refractive index-matched medium are arranged within an optical resonator as a laser gain medium. The "refractive index-matched medium" used herein denotes a medium having such refractive index that the difference in refractive index between the dielectric grains doped with a laser luminous element and the medium is relatively small. Provided the refractive index of the former (dielectric grains doped with a laser luminous element) is $n_1$, the refractive index of the latter (refractive index-matched medium) is $n_2$, and the absolute difference in refractive index between the two is $n=|n_1-n_2|$, the relative refractive index difference $r_n=n/n_1$, should desirably be as close to zero as possible. When actually selecting materials, an upper limit of, for example, $r_n \leq 0.45$, may be adopted as a criterion.

In the case where the numerous dielectric grains doped with a luminous element have so small a diameter (e.g., 1 mm or less) that they can be suspended as suspended grains in fluid having refractive index matched with that of the dielectric grains, the numerous dielectric grains and the fluid may be contained in the cell in the form of suspension, and the cell is disposed in the optical resonator to constitute a laser oscillator.

On the other hand, where the numerous dielectric grains doped with a luminous element have such a large diameter that they can not be suspended in the refractive index-matched fluid, the numerous dielectric grains are contained in the cell in a manner such that they are immersed in filling liquid having refractive index matched with that of the dielectric grains, and the cell is disposed in the optical resonator to constitute a laser oscillator.

Preferably, the cell is connected to a circulation system for circulating the suspension or the filling liquid via a path extending outside of the cell, to thereby cool the suspension or the filling liquid. In this case, the suspension or the filling liquid may be caused to flow within the cell either in a direction substantially parallel to or in a direction traversing the optical axis of the optical resonator. The former is advantageous in that the structure can be simplified, while the latter is advantageous in that the cooling can be efficiently performed.

The cell may have a shape of either slab or rod, as in the case of a solid-state laser using a bulk of similar composition (luminous element+dielectric). It is also possible to machine input/output windows at opposite ends of the cell so as to be inclined at Brewster's angle.

As materials of the dielectric grains to be doped with a luminous element, $Al_2O_3$, YAG, $YAlO_3$, $YVO_4$, S-VAP, $GdVO_4$, GLF, BYF, KYF, KLYF, KLGF, GGG, LOS, BGO, etc. can be given as specific examples. The luminous element used as a dopant may be Cr or Ti, in addition to lanthanide series.

A large number of dielectric grains doped with a laser luminous element are distributed in a medium having refractive index matched with that of the dielectric grains and the medium having the dielectric grains distributed therein is used as the laser gain medium, whereby the conventional problem of resonator loss can be solved for the reason explained below, referring to FIGS. 1 and 2.

FIGS. 1 and 2 illustrate light scattering and refraction observed, respectively, in the case where there is a large difference in refractive index between a dielectric grain and a medium surrounding the same, and in the case where the refractive index difference is small (the dielectric grain is surrounded by refractive index-matched fluid).

As shown in FIGS. 1 and 2, in general, when incident light 7 falls upon the surface of a dielectric grain 10 (refractive index: $n_1$) from a medium (refractive index: $n_2$; $n_2 \neq n_1$) surrounding the dielectric grain 10, part of the light is propagated through the grain (internally propagated light 71) while the remaining light is reflected (reflected light 72). The internally propagated light 71 then impinges on the surface of the dielectric grain 10 from inside and is split into transmitted light 73 and internally reflected light 74. Most of the internally reflected light 74 travels to the outside of the dielectric grain 10 as retrograde light 75.

As is well known in the basic theory of optics, where there is a large difference between the refractive index $n_1$ of the dielectric grain and the refractive index $n_2$ of the medium surrounding the grain (see FIG. 1), the rate of occurrence of the reflected light 72 or the internally reflected light 74 is high. Also, the direction of the incident light 7 and the direction of propagation of the transmitted light 73 are greatly different from each other. These factors are causes of increase in so-called granular-boundary scattering components. Since the refractive index of the dielectric grain is in general considerably greater than "1" (for example, the refractive index of $Al_2O_3$ is approximately 1.77), if a granular dielectric is arranged within the optical resonator in the same manner as in the case of using a dielectric bulk, then the aforementioned intergranular scattering occurs intensely, increasing the loss.

On the other hand, in the case where the refractive index $n_1$ of the dielectric grain and the refractive index $n_2$ of the medium surrounding the grain are close to each other, that is, where the dielectric grain is suspended or immersed in the refractive index-matched fluid (see FIG. 2), the rate of occurrence of the reflected light 72 or the internally reflected light 74 is low and the directions of propagation of the incident light 7 and the transmitted light 73 are nearly parallel to each other. These factors each contribute to reducing the intergranular scattering component. As a result, the loss of the optical resonator lessens, permitting efficient laser oscillation.

Thus, in the laser oscillator according to the present invention, a large number of dielectric grains are used to thereby secure a sufficient laser gain volume, and the dielectric grains are distributed in the refractive index-matched fluid, so that the laser resonator loss caused due to light scattering within the gain medium can be lessened. It is, therefore, possible to provide a high-efficiency, high-output laser oscillator that can be produced more easily than ever.

BEST MODE OF CARRYING OUT THE INVENTION

Embodiments [1] to [6] of the present invention will be hereinafter described referring to FIGS. 3 through 8.

Embodiment [1]

Figure 3:
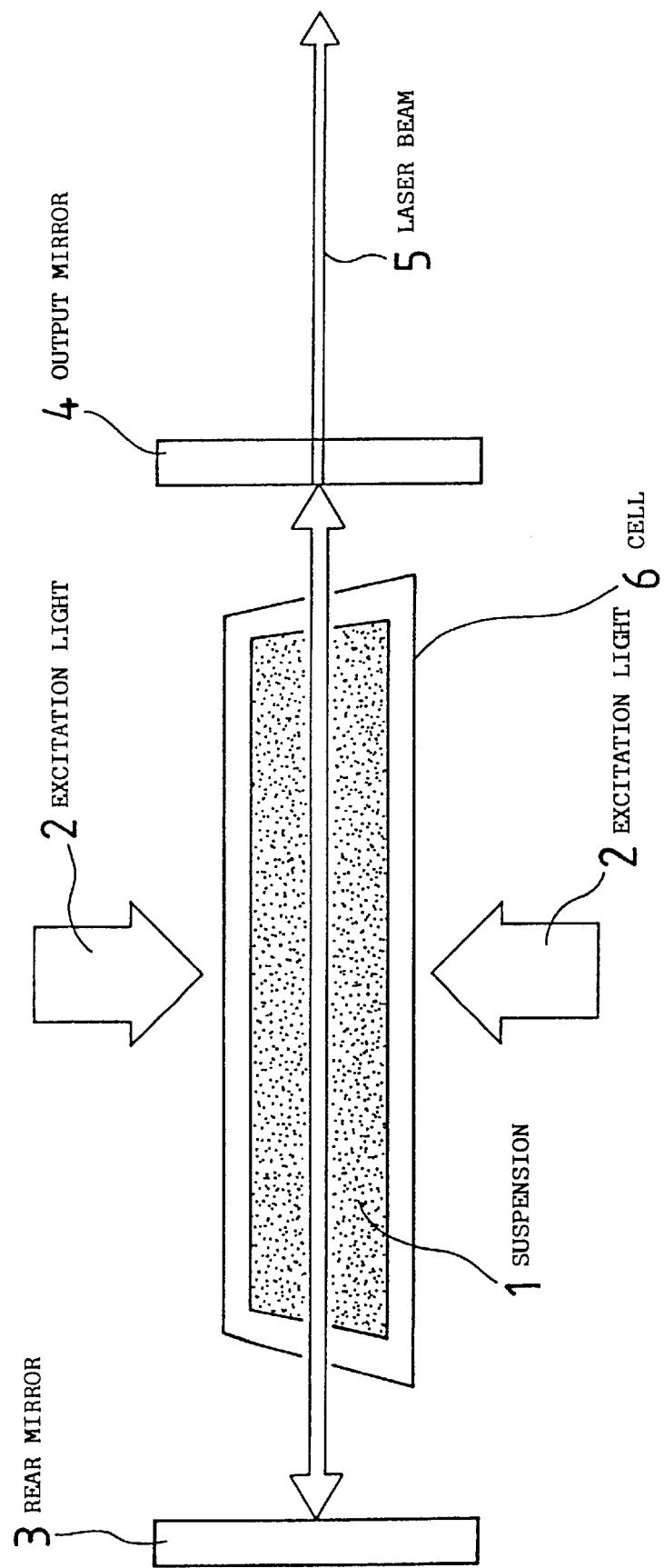
FIG. 3 is a sectional view showing the arrangement of a principal part of a laser oscillator according to Embodiment [1]

FIG. 3 illustrates, in section, the arrangement of a principal part of a laser oscillator according to Embodiment [1]. In FIG. 3, a gain medium characterizing the present invention is embodied as a suspension 1. The suspension 1 is obtained by dispersing a large number of fine dielectric grains (e.g., of a grain diameter of 1 mm or less), which have been doped with lanthanide series or the like, in refractive index-matched fluid so as to be suspended therein, the suspension being filled in a cell 6. The cell 6 filled with the suspension 1 is arranged within an optical resonator constituted by a rear mirror (total reflection mirror) 3 and an output mirror (partial transmission mirror) 4.

The illustrated cell 6 is in the form of a slab whose opposite end faces are machined to be inclined at Brewster's angle, but the cell may alternatively take the form of a rod. Further, the machining of the cell to obtain end faces inclined at Brewster's angle may in some cases be omitted. This applies not only to this embodiment but also to Embodiments [2] through [6].

One example of the dopant used is Ti, and a dielectric used in combination with this is, for example, $Al_2O_3$. Other gain media than the combination Ti:$Al_2O_3$ include, for example, Yb, Cr, Nd, Er, Hf or the like as the dopant, and YAG, $YAlO_3$, $YVO_4$, S-VAP, $GdVO_4$, GLF, BYF, KYF, KLYF, KLGF, GGG, LOS, BGO or the like as the dielectric.

Where Ti:$Al_2O_3$ is used as the gain medium, the refractive index of $Al_2O_3$ is approximately 1.77 and this value does not change much even if $Al_2O_3$ is doped with Ti (in general, the dopant concentration is very small); therefore, for the suspending medium, liquid may be used which is obtained by diluting a saturated solution, which contains a mixture of methylene iodide, yellow phosphorus and sulfur in the ratio of 1:8:1, for example, with methylene iodide to obtain an approximately 1/11 dilution.

In the case where the suspension 1 contains Nd:YAG, for example, and not Ti:$Al_2O_3$, the dilution may be about 1/4. When selecting the suspending medium, care must be taken that the refractive index of the suspending medium is as close to that of the dielectric grains as possible (i.e., the relative refractive index difference $r_n$ between the suspending medium and the dielectric grains is close to zero), and for materials that fulfill this condition to an almost identical degree, those materials which have as small an absorbance as possible with respect to the wavelength of the laser as well as to the wavelength of excitation light should preferably be selected.

When the cell 6, which is filled with the suspension 1 selected taking the above into account, is irradiated with excitation light 2, the numerous dielectric grains doped with lanthanide series or the like and suspended in the suspension 1 are subjected to laser pumping and laser oscillation takes place inside the optical resonator constituted by the rear mirror 3 and the output mirror 4, so that a laser beam 5 is output from the output mirror 4.

Figure 1:
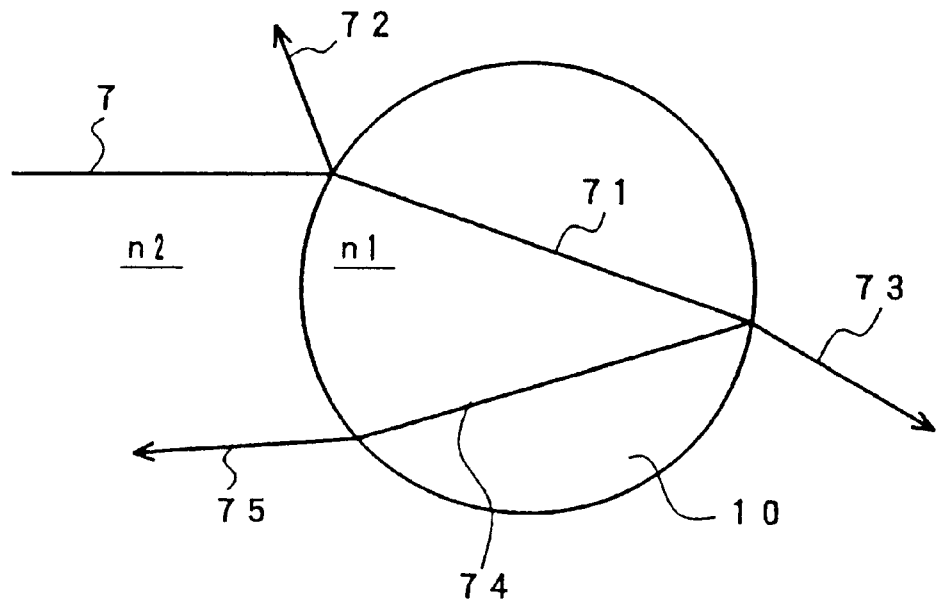
FIG. 1 is a diagram illustrating light scattering and refraction observed in the case where there is a large difference in refractive index between a dielectric grain and a medium surrounding the grain.
Figure 2:
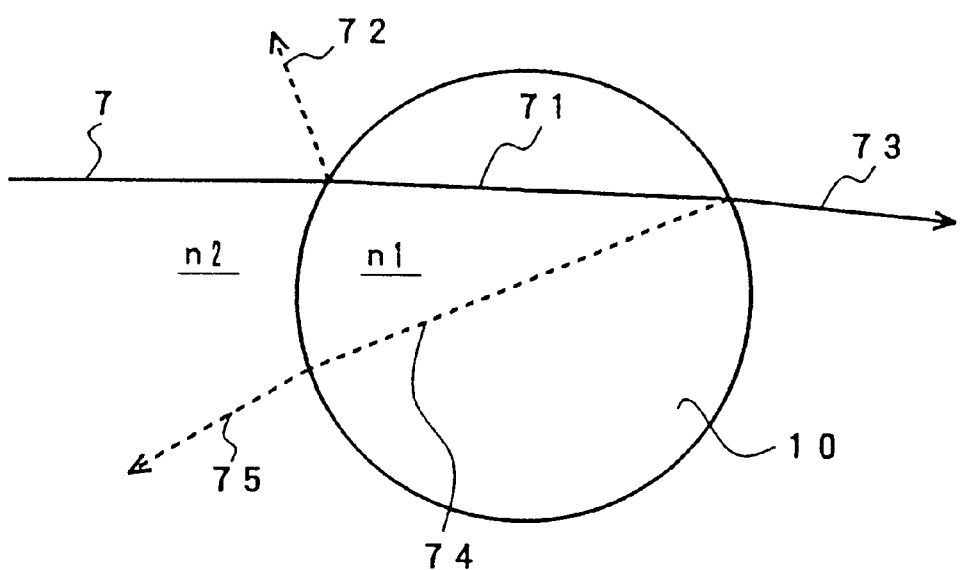
FIG. 2 is a diagram illustrating light scattering and refraction observed in the case where a dielectric grain is surrounded by refractive index-matched fluid.

The laser beam 5 is propagated through the suspension in the cell 6, and since the suspending medium is selected such that change in the refractive index at its interface with the dielectric grains is small, neither scattering nor refraction of the laser beam is noticeable when the beam passes across the interface with the dielectric grains, as mentioned above, never causing a large resonator loss. Thus, according to this embodiment, a laser oscillator is provided in which a large number of dielectric grains doped with lanthanide series or the like are dispersed in the refractive index-matched medium and which has a small resonator loss. Although the illustration of FIG. 1 is such that the excitation light 2 is radiated from outside the cell 6, the source of the excitation light may be located either outside or inside of the cell 6. In the case where the excitation light source is arranged outside the cell 6, however, part of the cell where the excitation light is to be introduced, in addition to windows at the opposite ends thereof through which the laser beam is transmitted, needs to be transparent. This is the case with the other embodiments described below.

Embodiment [2]

Figure 4:
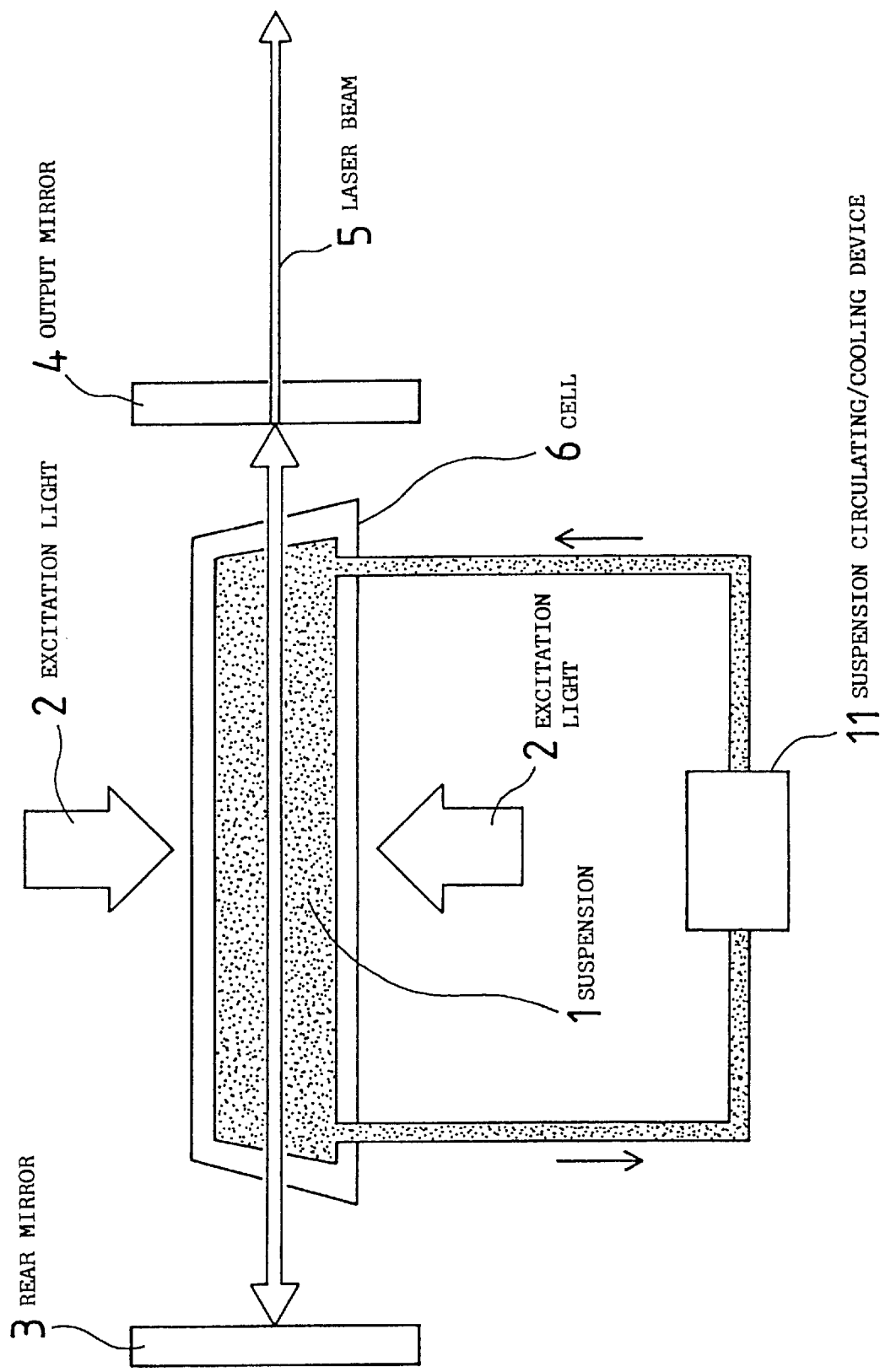
FIG. 4 is a sectional view showing the arrangement of a principal part of a laser oscillator according to Embodiment [2]

FIG. 4 illustrates the arrangement of a principal part of a laser oscillator according to Embodiment [2] in a manner similar to FIG. 3. Compared with the laser oscillator of Embodiment [1] shown in FIG. 3, the laser oscillator of this embodiment additionally includes a suspension circulating/cooling device 11. Similar to an ordinary fluid circulating/cooling device, the suspension circulating/cooling device 11 to be used may be of the type equipped with a circulating pump for circulating the suspension 1 and a cooler for forcibly cooling the suspension 1. If, however, the suspension 1 can be sufficiently cooled while being circulated, the cooler may be omitted from the device.

The arrangement of the laser oscillator except the parts associated with the suspension circulating/cooling device 11 is identical with that of the laser oscillator of Embodiment [1]. Namely, the suspension 1 is obtained by dispersing a number of fine dielectric grains (e.g., of a grain diameter of 1 mm or less) as suspended grains, which have been doped with lanthanide series or the like, in the refractive index-matched fluid, and is enclosed within a circulation path including the cell 6 and the suspension circulating/cooling device 11 to flow therethrough for circulation. The cell 6, which is part of the circulation path for the suspension 1, is disposed in the optical resonator constituted by the rear mirror (total reflection mirror) 3 and the output mirror (partial transmission mirror) 4, like Embodiment [1]. The composition of the suspension 1 is identical with that explained with reference to Embodiment [1], and therefore, description thereof is omitted.

While the suspension circulating/cooling device 11 of the laser oscillator shown in FIG. 4 is operated, the cell 6 is irradiated with the excitation light 2, whereupon the numerous dielectric grains doped with lanthanoide series or the like and suspended in the suspension 1 are subjected to laser pumping and laser oscillation takes place inside the optical resonator constituted by the rear mirror 3 and the output mirror 4, so that a laser beam 5 is output from the output mirror 4.

Since, in general, the energy efficiency of laser oscillation is not 100%, part of energy of the excitation light 2 unavoidably converts into thermal energy. As the temperatures inside and outside the cell 6 rise due to the thermal energy, the resonator loss occurs due to deformation of the cell 6 or dispersion occurs due to the Doppler effect, deteriorating the output characteristics of the laser oscillator. According to this embodiment, the suspension 1 is circulated in such a manner that it flows away from the optical resonator to a location on one side of the same and passes through the suspension circulating/cooling device 11, and therefore, the temperatures inside and outside the cell 6 are prevented from rising, thereby avoiding deterioration in the output characteristics.

Where the suspension 1 is caused to flow within the cell 6 in a direction parallel to the optical axis of the optical resonator as in the illustrated arrangement, the arrangement of parts surrounding the laser resonator can advantageously be kept simple even though the suspension circulating/cooling device 11 is incorporated, as compared with the case where the suspension flows in a direction traversing (e.g., perpendicular to) the optical axis of the optical resonator. It should be noted, however, that the effect of eliminating temperature gradient which is liable to occur in a region from the vicinity of the axis toward the periphery of the optical resonator somewhat lessens, compared with the case where the suspension 1 flows in a direction traversing the optical axis of the optical resonator (see the following explanation of Embodiment [3]).

Embodiment [3]

Figure 5:
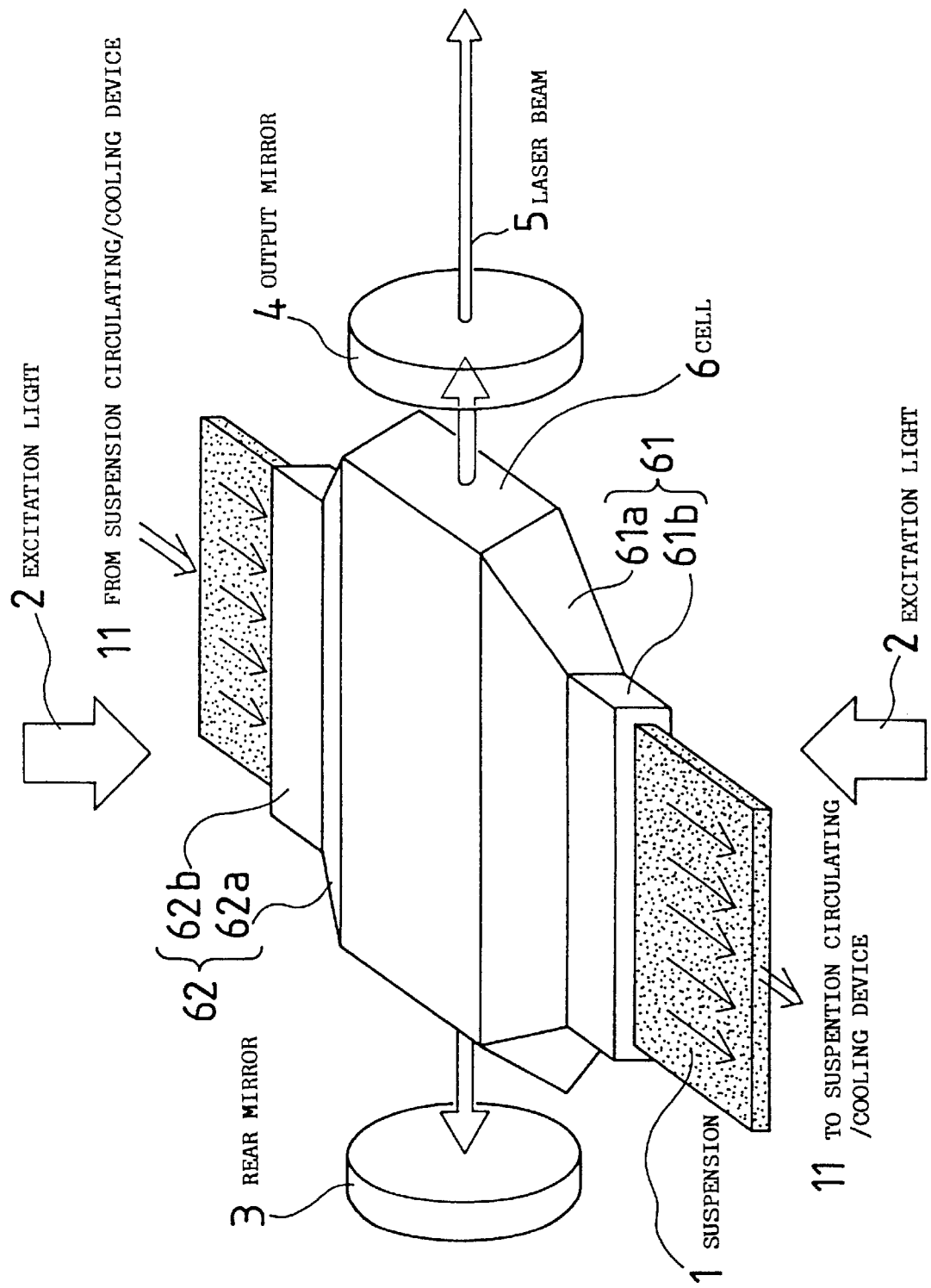
FIG. 5 is a schematic view showing the arrangement of a principal part of a laser oscillator according to Embodiment [3]

FIG. 5 is a schematic diagram illustrating the arrangement of a principal part of a laser oscillator according to Embodiment [3]. In the laser oscillator of this embodiment, a large number of fine dielectric grains (e.g., of a grain diameter of 1 mm or less) doped with lanthanide series or the like are dispersed as suspended grains in the refractive index-matched fluid and the suspension 1 thus obtained is circulated, as in Embodiment [2] shown in FIG. 4; however, Embodiment [3] differs from Embodiment [2] in that the suspension 1 is caused to flow within the cell 6 in a direction perpendicular to the optical axis of the optical resonator.

In this case, a smooth flow of the suspension 1 perpendicular to the optical axis of the optical resonator needs to be formed within the cell 6 by means of, for example, an outlet port 61 constituted by a tapered pipe portion 61a and a flat pipe portion 61b and an inlet port 62 constituted by a tapered pipe portion 62a and a flat pipe portion 62b, both of the ports 61 and 62 being connected to the cell 6. Consequently, the arrangement of parts surrounding the laser resonator is rather complicated, as compared with Embodiment [2] described above. Nevertheless, since the suspension 1 flows in a direction across the optical axis of the optical resonator, temperature gradient can advantageously be prevented from occurring in a region from the vicinity of the axis toward the periphery of the optical resonator.

Further, in the case where the suspension 1 is caused to flow within the cell 6 in a direction perpendicular to the optical axis of the optical resonator as in this embodiment, it is easy to make the cross-sectional area of the circulation passage relatively large, and accordingly, the circulation quantity of the suspension 1 can be increased even if the circulation velocity is low, thus facilitating efficient heat removal. In FIG. 5, the suspension circulating/cooling device arranged so as to connect the outlet port 61 to the inlet port 62 is omitted.

Embodiment [4]

Figure 6:
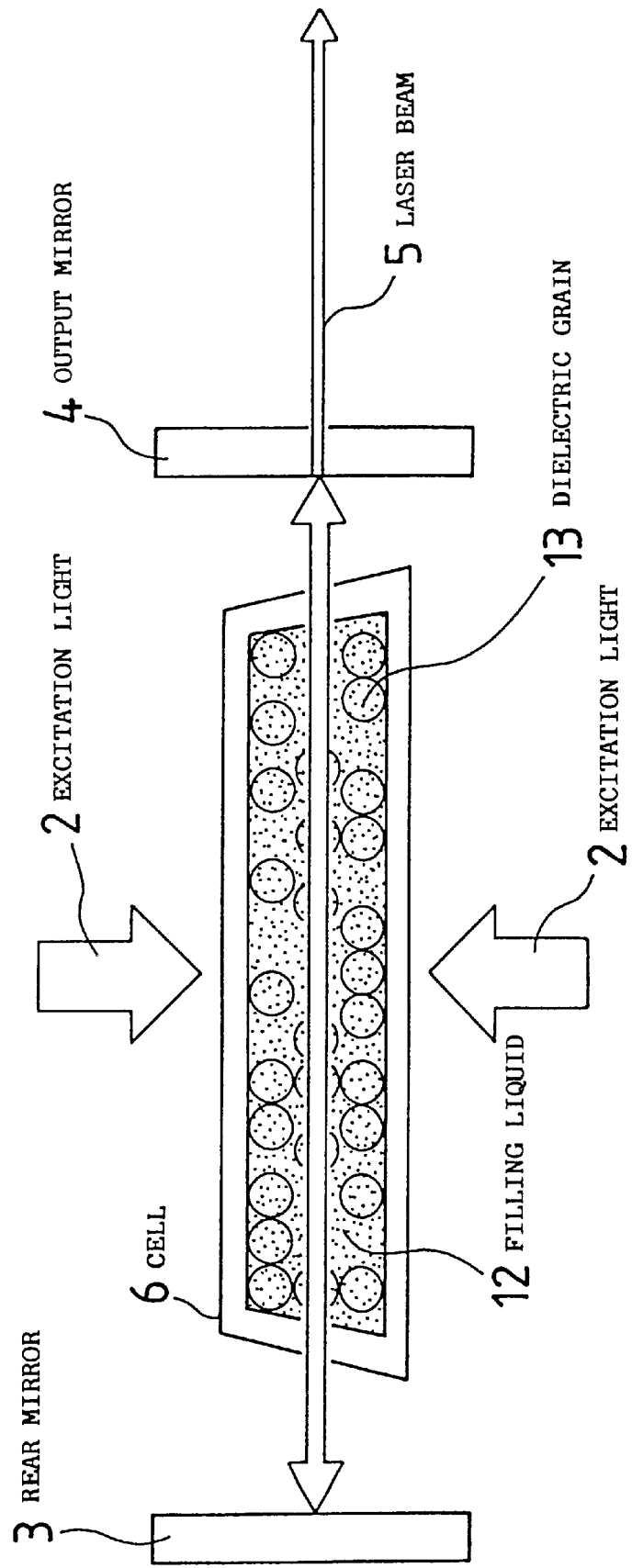
FIG. 6 is a sectional view showing the arrangement of a principal part of a laser oscillator according to Embodiment [4]

FIG. 6 is a sectional view similar to FIG. 1 and shows the arrangement of a principal part of a laser oscillator according to Embodiment [4]. In the laser oscillator of this embodiment, the dielectric grains in the laser oscillator according to Embodiment [1] shown in FIG. 3, which comprise fine grains dispersed and suspended in the refractive index-matched fluid, are replaced by a medium of relatively large size (e.g., 1 mm to several centimeters in grain diameter) immersed and distributed in the refractive index-matched fluid.

In this embodiment, a large number of dielectric grains 13 doped with lanthanoide series or the like are enclosed within the cell 6 in a manner such that the grains are immersed in filling liquid 12 which is refractive index-matched fluid, and the cell is disposed inside the optical resonator constituted by the rear mirror 3 and the output mirror 4. Namely, this embodiment uses, as the laser gain medium, the dielectric grains 13 having so large a grain diameter that they cannot be suspended in the refractive index-matched fluid, and is similar in arrangement to Embodiment [1] except that the dielectric grains used have a larger diameter.

Specifically, the cell 6 is in the form of a slab whose opposite end faces are machined so as to be inclined at Brewster's angle. The composition of the dielectric grains 13, which are accommodated in the cell 6 together with the filling liquid 12, is identical with that used in Embodiments [1] to [3]. Namely, the grains to be used may be made of a material containing a dielectric, such as $Al_2O_3$, YAG, $YAlO_3$, $YVO_4$, S-VAP, $GdVO_4$, GLF, BYF, KYF, KLYF, KLGF, GGG, LOS, BGO or the like, admixed with Ti, Yb, Cr, Nd, Er, Hf or the like as a dopant.

The composition of the filling liquid (refractive index-matched fluid) 12 may also be identical with that used in Embodiments [1] to [3]. For example, where dielectric grains containing $Al_2O_3$ as a main component are used, the refractive index thereof is approximately 1.77; therefore, for the filling liquid 12, liquid may be used which is obtained by diluting a saturated solution, which contains a mixture of methylene iodide, yellow phosphorus and sulfur in the ratio of 1:8:1, for example, with methylene iodide to obtain an approximately 1/11 dilution. In the case where the dopant-dielectric combination used is Nd:YAG, the above liquid may be diluted to obtain an approximately 1/4 dilution.

When selecting the filling liquid 12, similar care to that required when selecting the suspending medium should be taken. Specifically, as the filling liquid 12, a material of which the refractive index is as close to that of the dielectric grains as possible and at the same time which has as small an absorptance as possible with respect to the wavelength of the laser as well as to the wavelength of the excitation light should preferably be selected.

When the cell 6, which is filled with the dielectric grains 13 and the filling liquid 12 selected taking the above into account, is irradiated with the excitation light 2, the numerous dielectric grains 13 doped with lanthanide series or the like are subjected to laser pumping and laser oscillation takes place inside the optical resonator constituted by the rear mirror 3 and the output mirror 4, so that a laser beam 5 is output from the output mirror 4.

The laser beam 5 encounters the dielectric grains 13 one after another while being propagated through the filling liquid 12 in the cell 6, and since the filling liquid 12 is selected such that change in the refractive index at its interface with the dielectric grains 13 is small, neither scattering nor refraction of the laser beam is noticeable when the beam passes across the interfaces between the filling liquid 12 and the dielectric grains 13, as mentioned above, never causing a large resonator loss. Thus, also according to this embodiment, a laser oscillator is provided in which a large number of dielectric grains doped with lanthanoide series or the like are distributed in the refractive index-matched medium and which has a small resonator loss.

Embodiment [5]

Figure 7:
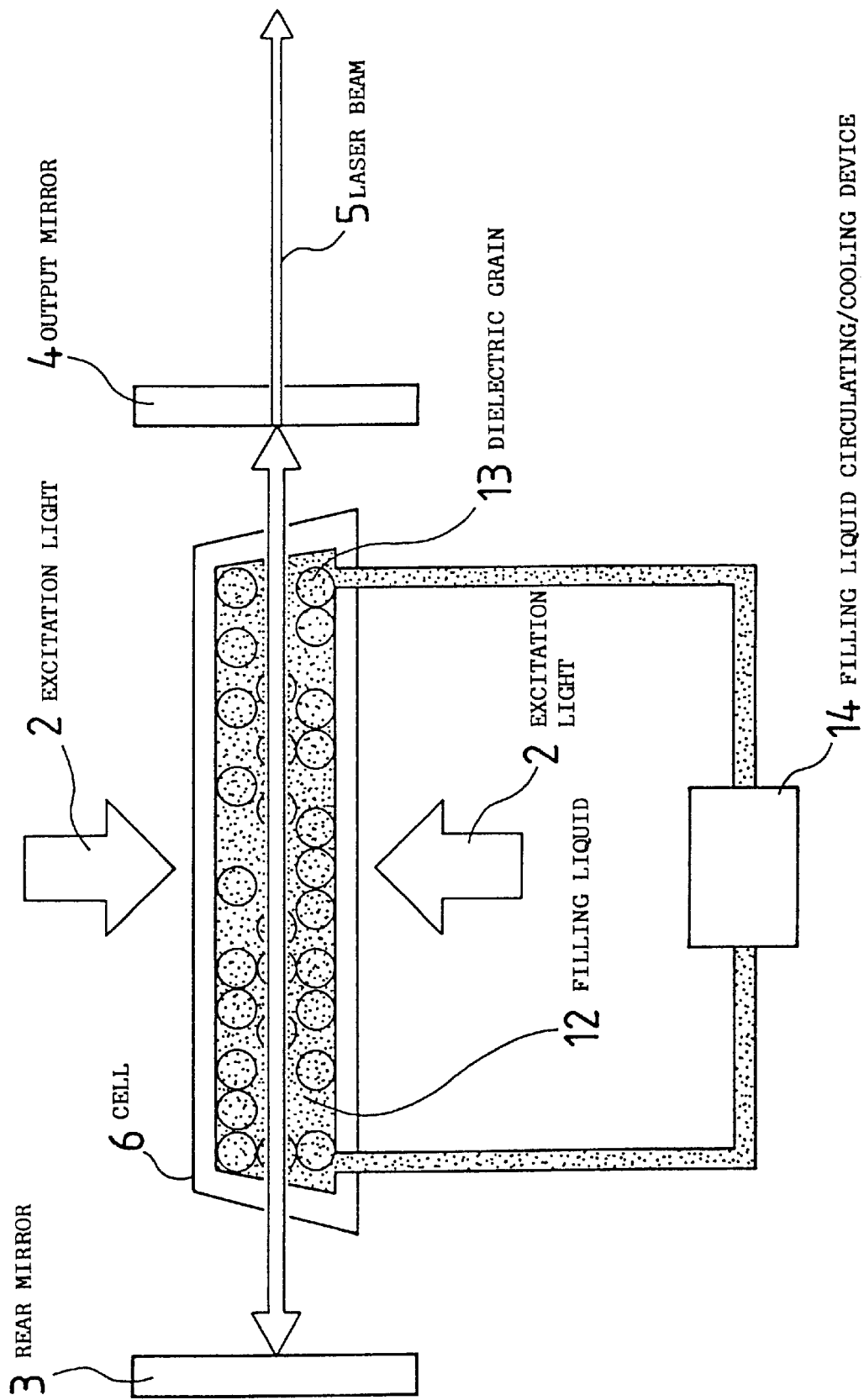
FIG. 7 is a sectional view showing the arrangement of a principal part of a laser oscillator according to Embodiment [5]

FIG. 7 illustrates the arrangement of a principal part of a laser oscillator according to Embodiment [5] in a manner similar to FIG. 1 or 4. Compared with the laser oscillator of Embodiment [4] shown in FIG. 6, the laser oscillator of this embodiment additionally includes a filling liquid circulating/cooling device 14. As the filling liquid circulating/cooling device 14, an ordinary fluid circulating/cooling device can be used to circulate and cool the filling liquid 12, and may be of the type equipped with a circulating pump and a cooler for forcibly cooling the filling liquid 12. If, however, the filling liquid 12 can be sufficiently cooled while being circulated as in the case of circulating the suspension n Embodiment [2] or [3], the cooler may be omitted from the device.

The laser oscillator of this embodiment is identical in arrangement with that of Embodiment [4] except for the parts associated with the filling liquid circulating/cooling device 14. Specifically, a number of dielectric grains of relatively large size (e.g., 1 mm to several centimeters in grain diameter), which have been doped with lanthanide series or the like, are immersed and distributed in the filling liquid 12 which is refractive index-matched fluid. Although this embodiment is similar in arrangement to Embodiment [2], the laser gain medium used is not suspended grains, but immersed grains distributed in the filling liquid (refractive index-matched fluid) 12, and therefore, this embodiment differs from Embodiment [2] in that only the filling liquid (refractive index-matched fluid) 12 is allowed to flow through the circulation passage which extends outside of the optical resonator. In the case where the diameter of the dielectric grains 13 is equal to or smaller than that of filling liquid outlet and inlet at opposite ends of the cell 6, a suitable grid member or the like is desirably provided so that the dielectric grains 13 can be prevented from flowing out of the cell 6.

Like Embodiment [4], the cell 6, which forms part of the circulation path for the filling liquid 12, is in the form of a slab whose end faces are machined so as to be inclined at Brewster's angle, and is disposed in the optical resonator constituted by the rear mirror (total reflection mirror) 3 and the output mirror (partial transmission mirror) 4. The compositions of the dielectric grains 13 and the filling liquid 12 are identical with those used in Embodiment [4], and therefore, description thereof is omitted.

While the filling liquid circulating/cooling device 14 of the laser oscillator shown in FIG. 7 is operated, the cell 6 is irradiated with the excitation light 2, whereupon the numerous dielectric grains 13 doped with lanthanoide series or the like and immersed in the filling liquid 12 are subjected to laser pumping and laser oscillation takes place inside the optical resonator constituted by the rear mirror 3 and the output mirror 4, so that a laser beam 5 is output from the output mirror 4.

The thermal energy generated within the cell 6 is conveyed by the filling liquid 12 which flows inside the cell 6 in the direction of the optical axis thereof and then to the outside of the optical resonator from one end portion of the cell 6. The filling liquid thereafter passes through the filling liquid circulating/cooling device 14 and, after heat is dissipated satisfactorily, flows again into the cell 6 from the other end portion thereof. Consequently, the resonator loss which is attributable to deformation of the cell 6 due to increase in temperature, dispersion due to the Doppler effect, etc. can be prevented, thereby avoiding deterioration in the output characteristics of the laser oscillator.

In the case where the filling liquid 12 is caused to flow within the cell 6 in a direction parallel to the optical axis of the optical resonator as in this arrangement, the arrangement of parts surrounding the laser resonator can advantageously be kept simple even though the filling liquid circulating/cooling device 14 is incorporated, as compared with the case where the filling liquid flows in a direction across (e.g., perpendicular to) the optical axis of the optical resonator. It should be noted, however, that like Embodiment [2], the effect of eliminating the temperature gradient which is liable to occur in a region from the vicinity of the axis toward the periphery of the optical resonator somewhat lessens, as compared with the case where the filling liquid 12 flows in a direction across the optical axis of the optical resonator (see the following explanation of Embodiment [6]).

Embodiment [6]

Figure 8:
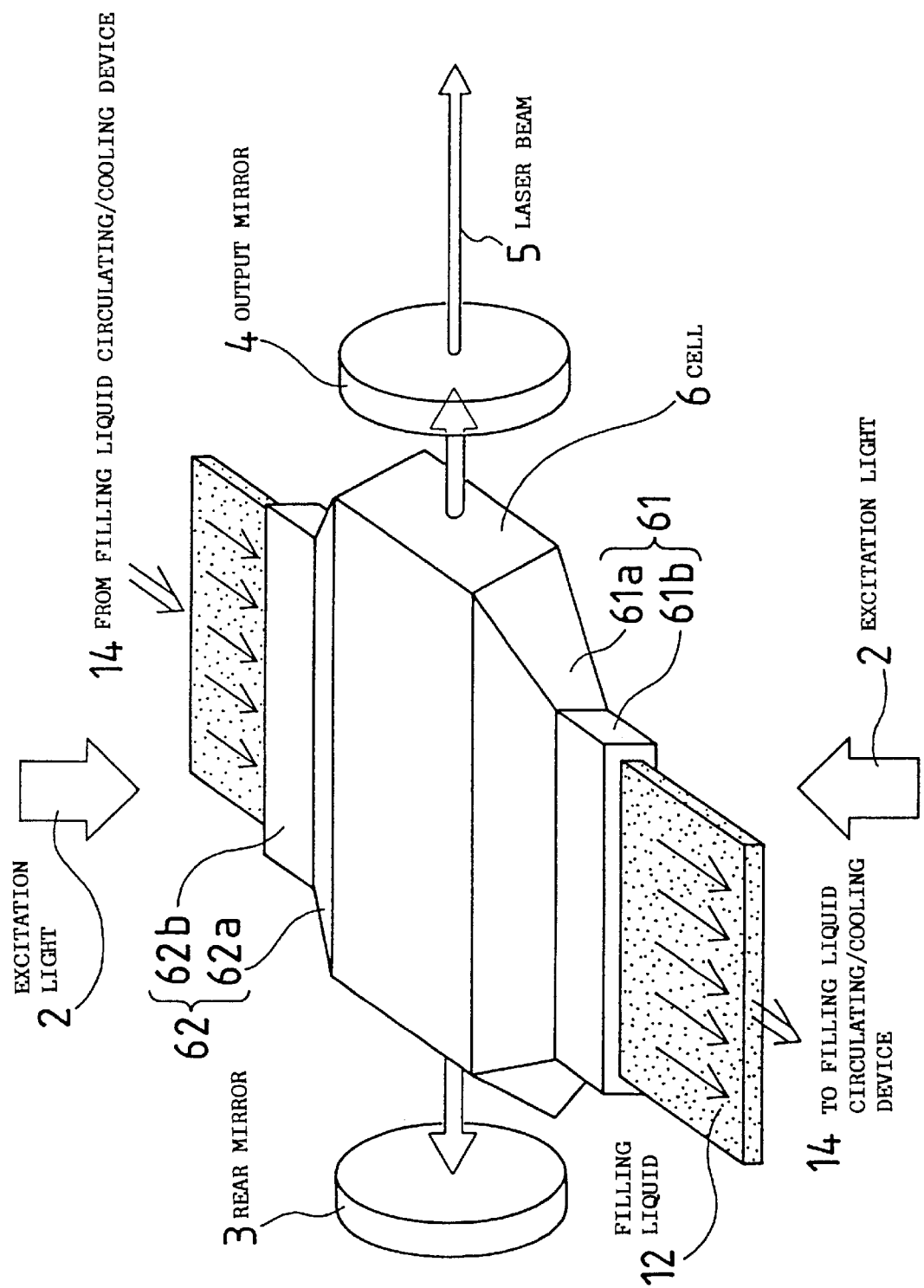
FIG. 8 is a schematic view showing the arrangement of a principal part of a laser oscillator according to Embodiment [6].

FIG. 8 schematically illustrates the arrangement of a principal part of a laser oscillator according to Embodiment [6]. In the laser oscillator of this embodiment, a number of dielectric grains of relatively large size (e.g., of 1 mm to several centimeters in grain diameter), which have been doped with lanthanide series or the like, are immersed and distributed in the filling liquid 12 which is refractive index-matched fluid, and the filling liquid 12 is circulated so as to flow outside of the optical resonator, as in Embodiment [5] shown in FIG. 7; however, Embodiment [6] differs from Embodiment [5] in that the filling liquid 12 is caused to flow within the cell 6 in a direction perpendicular to the optical axis of the optical resonator.

In this case, like Embodiment [3] (see FIG. 5), a smooth flow of the filling liquid 12 perpendicular to the optical axis of the optical resonator needs to be formed within the cell 6 by means of, for example, an outlet port 61 constituted by a tapered pipe portion 61a and a flat pipe portion 61b and an inlet port 62 constituted by a tapered pipe portion 62a and a flat pipe portion 62b, both of the ports 61 and 62 being connected to the cell 6. Also, where the diameter of the dielectric grains 13 is equal to or smaller than the maximum thickness (axis-side thickness) of the tapered portions 61a and 62a close to the cell 6, a suitable grid member or the like is desirably arranged in such a manner that it stretches over nearly the entire length of the cell 6, to thereby prevent the dielectric grains 13 from flowing out of the cell 6.

Thus, the arrangement of parts surrounding the laser resonator is rather complicated, as compared with Embodiment [5] described above. Nevertheless, since the filling liquid 12 flows in a direction across the optical axis of the optical resonator, temperature gradient can advantageously be prevented from occurring in a region from the vicinity of the axis toward the periphery of the optical resonator.

Further, in the case where the filling liquid 12 is caused to flow within the cell 6 in a direction perpendicular to the optical axis of the optical resonator as in this embodiment, it is easy to make the cross-sectional area of the circulation passage relatively large, and accordingly, the circulation quantity of the filling liquid 12 can be increased even if the circulation velocity is low, thus facilitating efficient heat removal. In FIG. 8, the filling liquid circulating/cooling device arranged so as to connect the outlet port 61 to the inlet port 62 is omitted.

In each of Embodiments [1] through [6] described above, a material obtained by doping a granular dielectric of small size with lanthanoide series or the like is used as the laser gain medium, and the dielectric material used should preferably be in the form of single crystal or amorphous (polycrystalline form is not preferred because of large internal scattering).

As described above, the present invention uses a granular dielectric admixed with a luminous element as the laser gain medium to secure a large gain volume, and also uses a refractive index-matched fluid to keep the resonator loss, which is caused by light scattering, at a low level. Accordingly, the present invention can provide a laser oscillator having efficiency and output performance comparable to a solid-state laser in general use which uses, as the gain medium, a solid material admixed with a rare-earth element or the like.

Generally, producing small-sized dielectric materials of high quality is much easier and less expensive than producing large-sized bulks, and this advantage is marked especially in cases where single-crystal dielectric is used. Also, the refractive index-matched fluid can be utilized as heat dissipating means as well, and thus deterioration in oscillation characteristics due to rise in temperature can be easily suppressed.

According to the present invention, therefore, it is possible to provide a laser oscillator which exhibits performance substantially equal to that of solid-state lasers using a laser gain medium of similar composition and yet can be produced much more easily and less expensively than such conventional solid-state lasers.

We claim:

1. A laser oscillator comprising:
    a large number of dielectric grains having a first refractive index and being doped with an element of the periodic table which has luminous properties;
    fluid having a second refractive index matched with the first refractive index of said dielectric grains; and
    an optical resonator;
    said dielectric grains and said fluid being positioned in said optical resonator as a laser gain medium, in the path of light passing through the optical resonator.

2. The laser oscillator according to claim 1, wherein said dielectric grains contains one of $Al_2O_3$, YAG, $YAlO_3$, $YVO_4$, S-VAP, $GdVO_4$, GLF, BYF, KYF, KLYF, KLGF, GGG, LOS and BGO.

3. The laser oscillator according to claim 1, wherein said dielectric grains are doped with one of lanthanoide series, Cr and Ti as said luminous element.

4. A laser oscillator according to claim 1, wherein the element of the periodic table is an element in the lanthanide series of the periodic table.

5. A laser oscillator according to claim 1, wherein the element of the periodic table is selected from the group consisting of Ti, Yb, Cr, Nd, Er and Hf.

6. A laser oscillator according to claim 1, wherein the dielectric grains of a diameter of 1 $\mu$m or less.

7. A laser oscillator according to claim 1, wherein the dielectric material is selected from the group consisting of $Al_2O_3$, YAG, $YAlO_3$, $YVO_4$, S-VAP, $GdVO_4$, GLF, BYF, KYF, KLYF, KLGF, GGG, LOS and BGO.

8. A laser oscillator comprising:
    a large number of dielectric grains having a first refractive index and being doped with an element of the periodic table which has luminous properties;
    fluid having a second refractive index matched with the first refractive index of said large number of dielectric grains, said dielectric grains being dispersed in said fluid to form a suspension;
    an optical resonator; and
    a cell positioned in said optical resonator, in the path of light passing through said optical resonator, and holding said suspension.

9. The laser oscillator according to claim 8, further comprising a circulation system connected to said cell for cooling said suspension.

10. The laser oscillator according to claim 9, wherein said suspension flows within said cell in a direction substantially parallel to an optical axis of said optical resonator.

11. The laser oscillator according to claim 9, wherein said suspension flows within said cell in a direction traversing an optical axis of said optical resonator.

12. The laser oscillator according to claim 8, wherein said cell has a shape of slab.

13. The laser oscillator according to claim 12, wherein said cell has end faces inclined at Brewster's angle.

14. The laser oscillator according to claim 8, wherein said cell has a shape of rod.

15. A laser oscillator according to claim 8, wherein the element of the periodic table is an element in the lanthanide series of the periodic table.

16. A laser oscillator according to claim 8, wherein the element of the periodic table is selected from the group consisting of Ti, Yb, Cr, Nd, Er and Hf.

17. A laser oscillator according to claim 8, wherein the dielectric grains of a diameter of 1 μm or less.

18. A laser oscillator according to claim 8, wherein the dielectric material is selected from the group consisting of $Al_2O_3$, YAG, $YAlO_3$, $YVO_4$, S-VAP, $GdVO_4$, GLF, BYF, KYF, KLYF, KLGF, GGG, LOS and BGO.

19. A laser oscillator comprising:

a large number of dielectric grains having a first refractive index and being doped with an element of the periodic table which has luminous properties;

filling liquid having a second refractive index matched with the first refractive index of said dielectric grains, said large number of dielectric grains being distributed and immersed in said filling liquid;

an optical resonator; and a cell positioned in said optical resonator, in the path of light passing through the optical resonator, and holding both said dielectric grains and said filling liquid.

20. The laser oscillator according to claim 19, further comprising a circulation system connected to said cell for cooling said filling liquid.

21. The laser oscillator according to claim 20, wherein said filling liquid flows within said cell in a direction substantially parallel to an optical axis of said optical resonator.

22. The laser oscillator according to claim 20, wherein said filling liquid flows within said cell in a direction traversing an optical axis of said optical resonator.

23. The laser oscillator according to claim 19, wherein said cell has a shape of slab.

24. The laser oscillator according to claim 23, wherein said cell has end faces inclined at Brewster's angle.

25. The laser oscillator according to claim 19, wherein said cell has a shape of rod.

26. A laser oscillator according to claim 19, wherein the element of the periodic table is an element in the lanthanide series of the periodic table.

27. A laser oscillator according to claim 19, wherein the element of the periodic table is selected from the group consisting of Ti, Yb, Cr, Nd, Er and Hf.

28. A laser oscillator according to claim 19, wherein the dielectric grains of a diameter of 1 μm or less.

29. A laser oscillator according to claim 19, wherein the dielectric material is selected from the group consisting of $Al_2O_3$, YAG, $YAlO_3$, $YVO_4$, S-VAP, $GdVO_4$, GLF, BYF, KYF, KLYF, KLGF, GGG, LOS and BGO.

* * * * *